United States Patent
Anderson

(10) Patent No.: US 8,998,473 B1
(45) Date of Patent: Apr. 7, 2015

(54) LIGHT REFLECTOR STRUCTURE FOR HORTICULTURAL LAMPS

(71) Applicant: Terry W Anderson, Hartland, WI (US)

(72) Inventor: Terry W Anderson, Hartland, WI (US)

( * ) Notice: Subject to any disclaimer, the term of this patent is extended or adjusted under 35 U.S.C. 154(b) by 0 days.

(21) Appl. No.: 13/999,587

(22) Filed: Mar. 10, 2014

(51) Int. Cl.
F21V 7/00 (2006.01)
F21V 17/00 (2006.01)

(52) U.S. Cl.
CPC . *F21V 7/00* (2013.01); *F21V 17/00* (2013.01); *Y10S 362/805* (2013.01)

(58) Field of Classification Search
USPC ......... 362/233, 234, 396, 376, 805, 563, 433, 362/434, 452, 453, 454
See application file for complete search history.

(56) References Cited

U.S. PATENT DOCUMENTS

| | | | |
|---|---|---|---|
| 3,590,237 A * | 6/1971 | Winters et al. | 362/367 |
| 3,950,637 A | 4/1976 | Rodin | |
| 4,277,822 A * | 7/1981 | Weber et al. | 362/352 |
| 4,653,223 A | 3/1987 | Mori | |
| 4,656,568 A * | 4/1987 | Reed | 362/352 |
| 4,992,917 A | 2/1991 | Earnshaw | |
| 5,065,294 A | 11/1991 | Poot, Jr. | |
| 5,353,746 A | 10/1994 | DelRosario | |
| D352,478 S | 11/1994 | Whittle | |
| 5,641,223 A | 6/1997 | Rustebakke | |
| 5,984,490 A * | 11/1999 | Leen | 362/240 |
| 6,042,250 A | 3/2000 | Stragnola | |
| 6,688,759 B1 | 2/2004 | Hadjimichael | |
| 6,921,182 B2 | 7/2005 | Anderson | |
| 7,013,080 B1 * | 3/2006 | Kaplanis et al. | 392/422 |
| 8,523,385 B2 | 9/2013 | Lu | |
| 8,604,700 B2 | 12/2013 | Waumans | |
| 2009/0288340 A1 | 11/2009 | Hess | |
| 2013/0255150 A1 | 10/2013 | Karpinski | |

FOREIGN PATENT DOCUMENTS

WO WO2009/141287 11/2009

* cited by examiner

Primary Examiner — Laura Tso
(74) Attorney, Agent, or Firm — Dennis W. Beech

(57) ABSTRACT

A light reflector frame has an upper wire frame and a lower wire frame each of generally rectangular form that are spaced apart and attached at an upper peripheral edge and a lower peripheral edge by a plurality of transverse brackets. At least four of the transverse brackets have a hook formed at a top end and a bottom end such that each of the hooks opens inwardly of the upper wire frame and the lower wire frame. At least one reflective panel is disposed inwardly of at least four transverse brackets to engage the hooks with a reflective surface of each reflective panel oriented inwardly of the transverse brackets. At least two pairs of opposed transverse brackets have an extended member at the top end positioned to extend upwardly over a cover of a horticultural lamp enclosure.

18 Claims, 6 Drawing Sheets

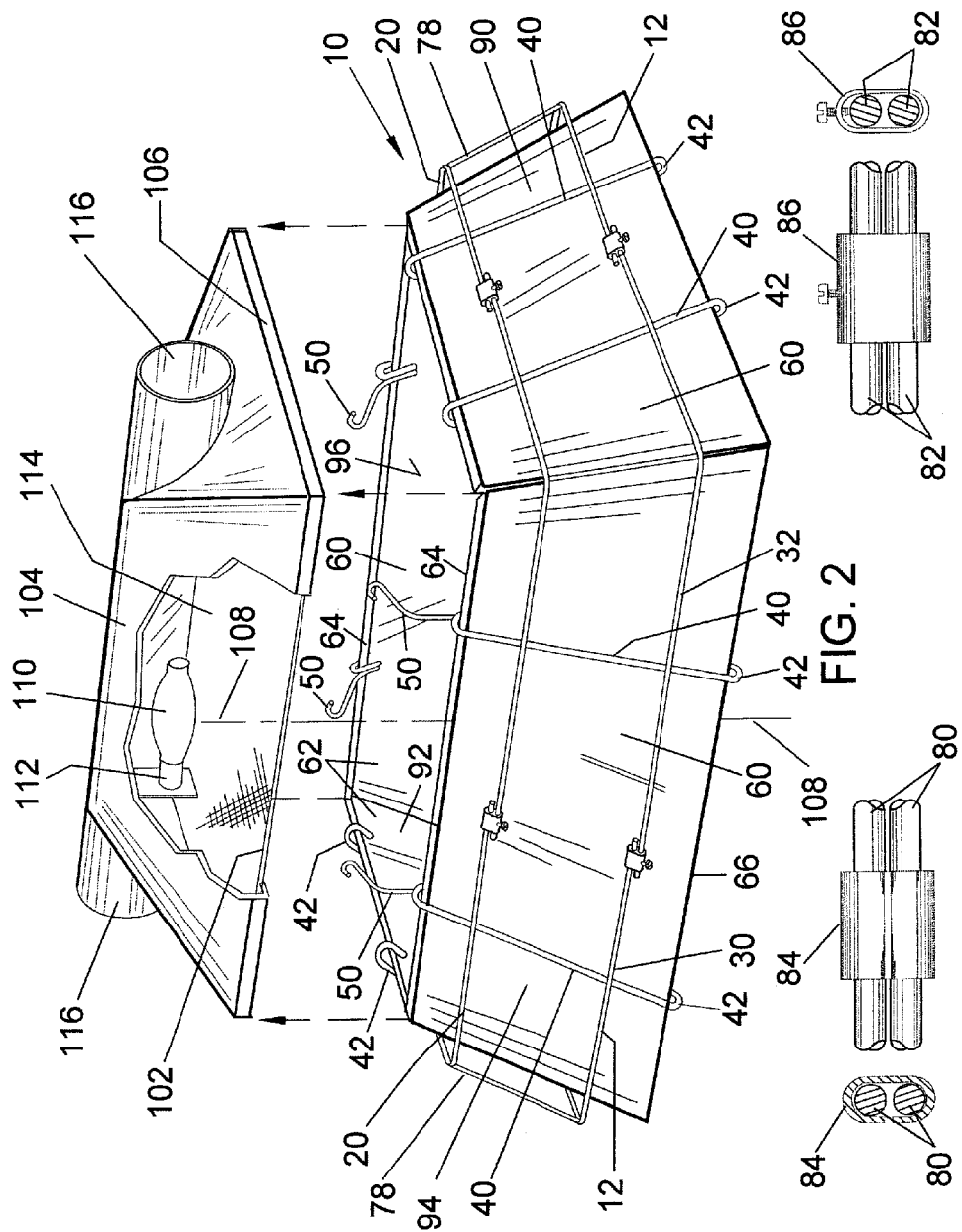

Lux Measurement Table

| Reference Points | Lux Readings W/O | W | Percent Difference | |
|---|---|---|---|---|
| 208 | 1600 | 2100 | 131.25 | |
| 209 | 1620 | 1850 | 114.20 | |
| 210 | 1520 | 2120 | 139.47 | |
| 211 | 2550 | 3200 | 125.49 | |
| 212 | 1380 | 1900 | 137.68 | |
| 213 | 1760 | 1890 | 107.39 | |
| 214 | 1420 | 1890 | 133.10 | 1 foot below lamp 126.94 % Average |
| 201 | 560 | 780 | 139.29 | |
| 202 | 770 | 790 | 102.60 | |
| 203 | 570 | 580 | 101.75 | |
| 204 | 960 | 1005 | 104.69 | |
| 205 | 480 | 625 | 130.21 | |
| 206 | 680 | 850 | 125.00 | |
| 207 | 540 | 650 | 120.37 | |
| 208 | 1025 | 1450 | 141.46 | |
| 209 | 1150 | 1400 | 121.74 | |
| 210 | 1090 | 1550 | 142.20 | |
| 211 | 1420 | 1860 | 130.99 | |
| 212 | 1100 | 1415 | 128.64 | |
| 213 | 1150 | 1340 | 116.52 | |
| 214 | 1050 | 1340 | 127.62 | 2 feet below lamp 123.79 % Average |
| 201 | 540 | 680 | 125.93 | |
| 202 | 660 | 760 | 115.15 | |
| 203 | 510 | 610 | 119.61 | |
| 204 | 660 | 870 | 131.82 | |
| 205 | 430 | 560 | 130.23 | |
| 206 | 600 | 735 | 122.50 | |
| 207 | 510 | 655 | 128.43 | |
| 208 | 750 | 1010 | 134.67 | |
| 209 | 820 | 970 | 118.29 | |
| 210 | 760 | 1040 | 136.84 | |
| 211 | 870 | 1210 | 139.08 | |
| 212 | 800 | 1030 | 128.75 | |
| 213 | 800 | 1015 | 126.88 | |
| 214 | 710 | 1020 | 143.66 | 3 feet below lamp 128.70 % Average |

Values in Lux Readings columns are in luxes.
W/O and W symbols identify without and with reflector panels 60.

FIG. 12

LIGHT REFLECTOR STRUCTURE FOR HORTICULTURAL LAMPS

BACKGROUND OF THE INVENTION

This invention relates to light reflective structures for attachment to horticultural lamps to improve plant growth. The new light reflector structure extends below a horticultural lamp to reflect light emitted from the lamp that travels to areas not under the lamp to return back under the lamp for increased intensity of light at elevations beneath the lamp.

Lamp or light sources with structures to improve light effectiveness for plant growth at elevation levels of a plant below the top leaf structure have been developed. Many of these focus on the use of the light emitting device itself, for example, the use of light emitting diodes of selected wavelengths that may penetrate the upper level leaf structure of a plant to cause light incidence on lower leaf structure for photosynthesis.

The lamps generally known for plant growth applications usually have an enclosure that may be dome or hood shaped with a light bulb or light source positioned in the enclosure to direct light downwardly onto the top of plants positioned below the lamp. The enclosure may have reflective material or coating on interior surfaces to further reflect light out of a bottom opening of the enclosure. Apparatus for plant culture may also be known wherein a plant is completely enclosed in a housing with light sources mounted on the housing to project onto the enclosed plant. This may be inefficient for mass plant growth in situations where one light illuminates several plants.

The use of light emitting lamps for plant growth generally positions the light emitting device in an enclosure that is closed with an open bottom that may be closed by a transparent or glass panel. Such lamps are then positioned over the plant to be grown. This arrangement is not efficient for plants that principally grow vertically with multiple levels of leaf structure since the leaves further from the lamp and below upper level leaves will receive reduced light intensity. Therefore, there is a need for a light reflector structure that is attachable to horticultural lamps to reflect light emitted from a lamp that would radiate into the environment rather than onto the plant. A light reflective structure that when attached to a lamp has subtending reflective panels positioned at proper angles to redirect lamp emitted light onto a plant at levels below the upper leaf level of a plant would increase the efficiency of plant growth. The lamp with light reflector structure can be adjusted in height as a plant grows thereby allowing close proximity of the light source to a plant.

SUMMARY OF THE INVENTION

The present invention is directed to structures that reflect light for horticultural lamps to improve plant growth by intensifying the light, and by focusing light on lower branches of the plant which would be otherwise shaded by upper branches. A light reflector frame has an upper wire frame and a lower wire frame each of generally rectangular form that are spaced apart and attached at an upper peripheral edge and a lower peripheral edge by a plurality of transverse brackets. At least four of the transverse brackets have a hook formed at a top end and a bottom end such that each of the hooks opens inwardly of the upper wire frame and the lower wire frame. At least one reflective panel is disposed inwardly of at least four transverse brackets to engage the hooks with a reflective surface of each reflective panel oriented inwardly of the transverse brackets. At least two pairs of opposed transverse brackets have an extended member at the top end positioned to extend upwardly over a cover of a horticultural lamp enclosure.

These and other features, aspects and advantages of the present invention will become better understood with reference to the following drawings, description and claims.

BRIEF DESCRIPTION OF THE DRAWINGS

FIG. 2 illustrates a perspective top view of a light reflector structure and partial cut away view of a lamp according to an embodiment of the invention;

FIG. 3 illustrates a spring clip according to an embodiment of the invention;

FIG. 4 illustrates a clamp according to an embodiment of the invention;

FIG. 12 illustrates a table of light reading values according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
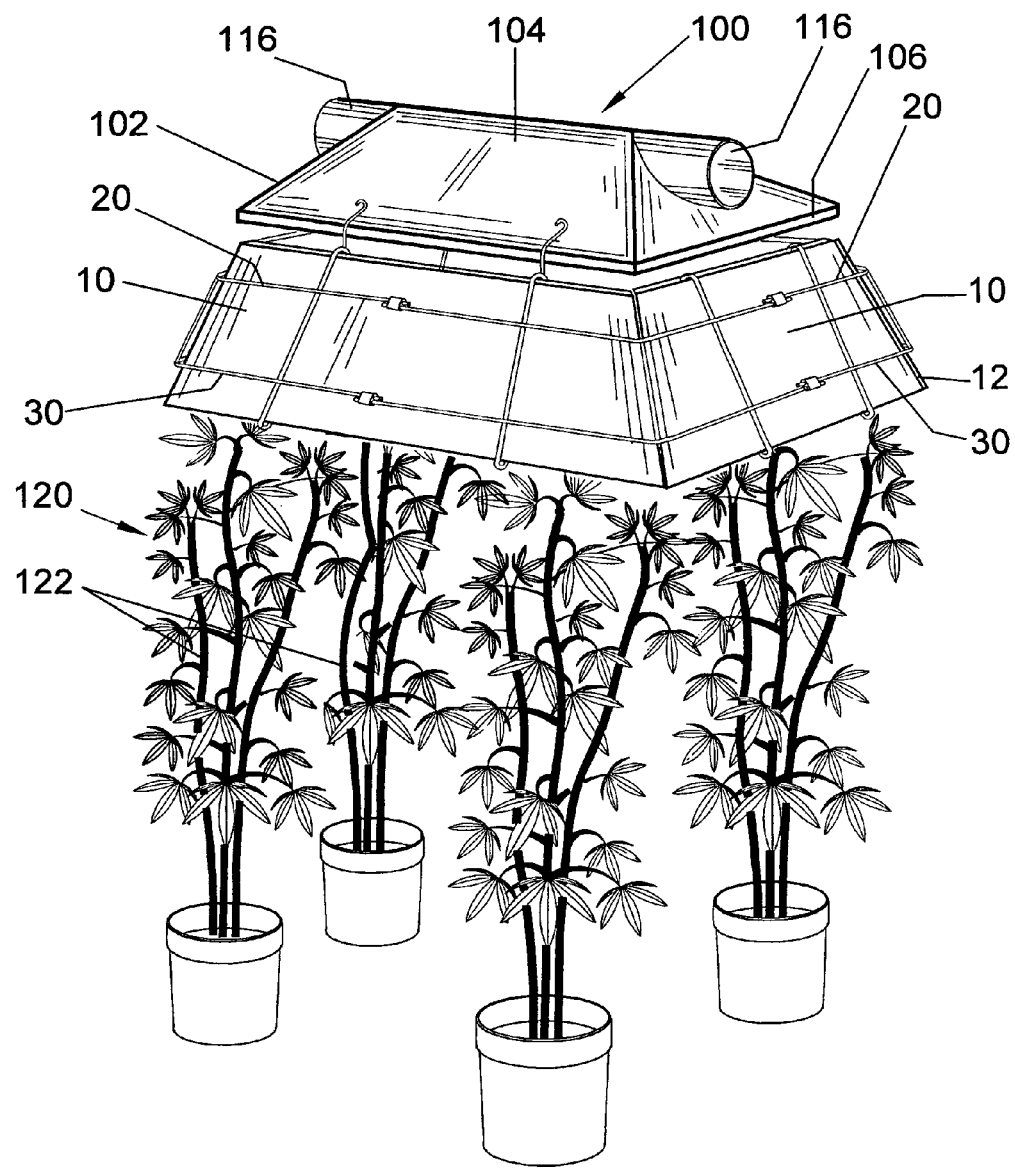
FIG. 1 illustrates a perspective top view of a light reflector structure attached to a horticulture lamp with plants positioned for growth according to an embodiment of the invention.
Figure 7:
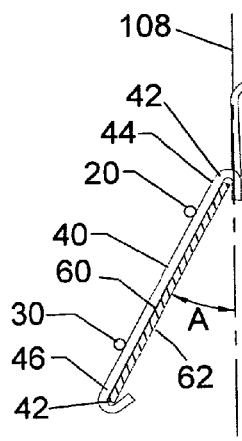
FIG. 7 illustrates a partial side elevation view of a transverse bracket with an extending member and a reflective panel according to an embodiment of the invention.
Figure 8:
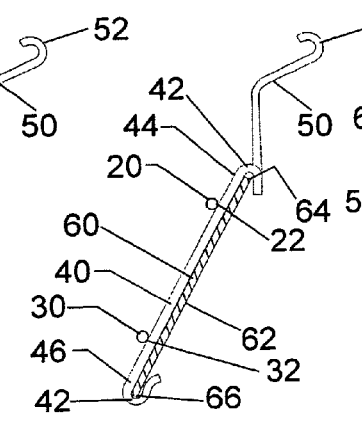
FIG. 8 illustrates a partial side elevation view of a transverse bracket with an extending member and a reflective panel according to an embodiment of the invention.
Figure 9:
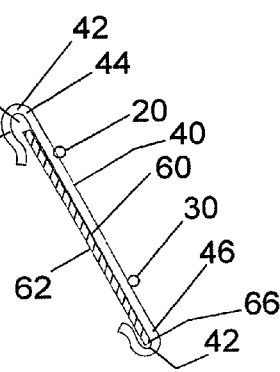
FIG. 9 illustrates a partial side elevation view of a transverse bracket and reflective panel according to an embodiment of the invention.
Figure 5:
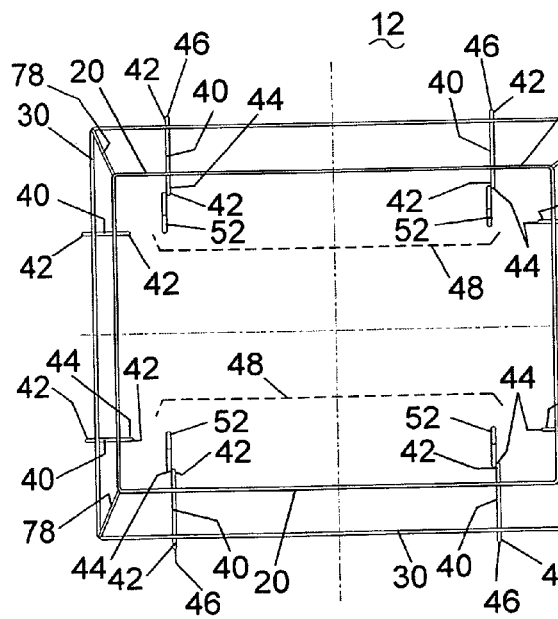
FIG. 5 illustrates a top plan view of a light reflector frame structure according to an embodiment of the invention.
Figure 6:
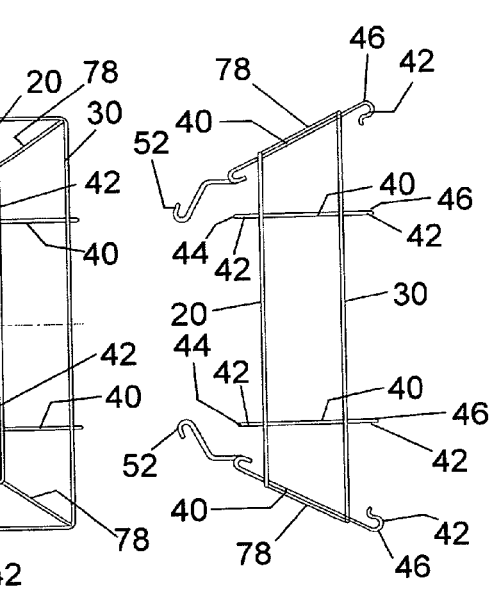
FIG. 6 illustrates an end view of a light reflector frame structure according to an embodiment of the invention.

Referring to FIGS. 1 through 10, a light reflector structure 10 for a horticultural lamp 100 for enhanced plant growth for plants 120 that may grow vertically with multiple levels of leaf 122 structure may be positioned on a lamp 100 to extend downwardly from a lower peripheral edge 106 of the lamp enclosure 102 or cover 104 and may be slanted relative to the vertical center line 108 of the lamp 100, as best viewed in FIGS. 1 and 2. The lamp 100 may have a generally centrally located elongated light bulb 110 in an electrical socket 112 and the enclosure 102 may be closed at an open bottom side of the cover 104 by a generally transparent panel 114, for example, glass panel. This lamp 100 structure allows light emission with reduced heat emission that may be vented through ports 116 in the cover 104 of the enclosure 102. One or more plants 120 may be positioned below the lamp 100 to receive the emitted light directly and to receive the reflected light from the light reflector structure 10 at the various levels of leaf 122 structure below the top levels of leaf growth.

The light reflector structure 10 may have an upper wire frame 20 and a lower wire frame 30 each of generally rectangular shape that are spaced apart with the upper wire frame 20 sized to the approximate shape of the peripheral edge 106 of the lamp cover 100 and the lower wire frame 30 sized to allow one or more reflective panels 60 to extend downwardly from the lamp and to extend outwardly from the centerline 108 of the lamp 100, as best viewed in FIGS. 1 and 2. The upper and lower wire frames 20, 30 are attached by at least four transverse brackets 40 that are attached adjacent a top end 44 to the upper wire frame 20 and adjacent a bottom end 46 to the lower wire frame 30. The top end 44 of each transverse bracket 40 may have an extending member 50 that extends upwardly and over the cover 104 of the lamp 100 to retain the light reflector structure 10 on the lamp 100.

The light reflector frame 12 may have eight transverse brackets 40 attached between the upper wire frame 20 and lower wire frame 30 with two opposed pairs of transverse brackets 48 having extension members 50 attached to allow positioning the light reflective structure 10 on a lamp enclosure 102 by moving the structure 10 over an end of a suspended lamp 100 without interference from the installed lamp 100 structure. The extension members 50 may have curved ends 52 to reduce damage to lamp covers 104, or non-abrasive tips and the like may be used. Other arrangements of the extension members 50 may be used depending on a particular lamp enclosure 102 configuration and the lamps 100 manner of installation or suspension.

The transverse brackets 40 are illustrated as attached at the peripheral edges 22, 32 of the upper and lower wire frames 20, 30 interior of the frames 20, 30 at the peripheral edges 22, 32 with a hook formed at the top ends 44 and bottom ends 46. This allows positioning reflective panels 60 interior to the wire light reflector frame 12 with a reflective surface 62 oriented inwardly relative to the lamp centerline 108 for effective light reflection onto plants 120.

The top and bottom ends 44, 46 may have hooks 42 formed and oriented inwardly for receipt of the reflective panels 60. The hooks 42 may be shaped to avoid scratching the surface of the panels 60, which might happen if hooks 42 were curved parallel to brackets 40. Depending on how the light reflector structure 10 is assembled, the panels may be slidably inserted at one end between the hooks, or the space in the hooks 42 at the top ends 44 may allow moving the top edge 64 of a panel 60 into the hooks 42 to then move the bottom edge 66 of the panels 60 into the bottom end hooks 42 wherein top end 44 hook end 54 is long enough to retain the panel 60.

Figure 10:
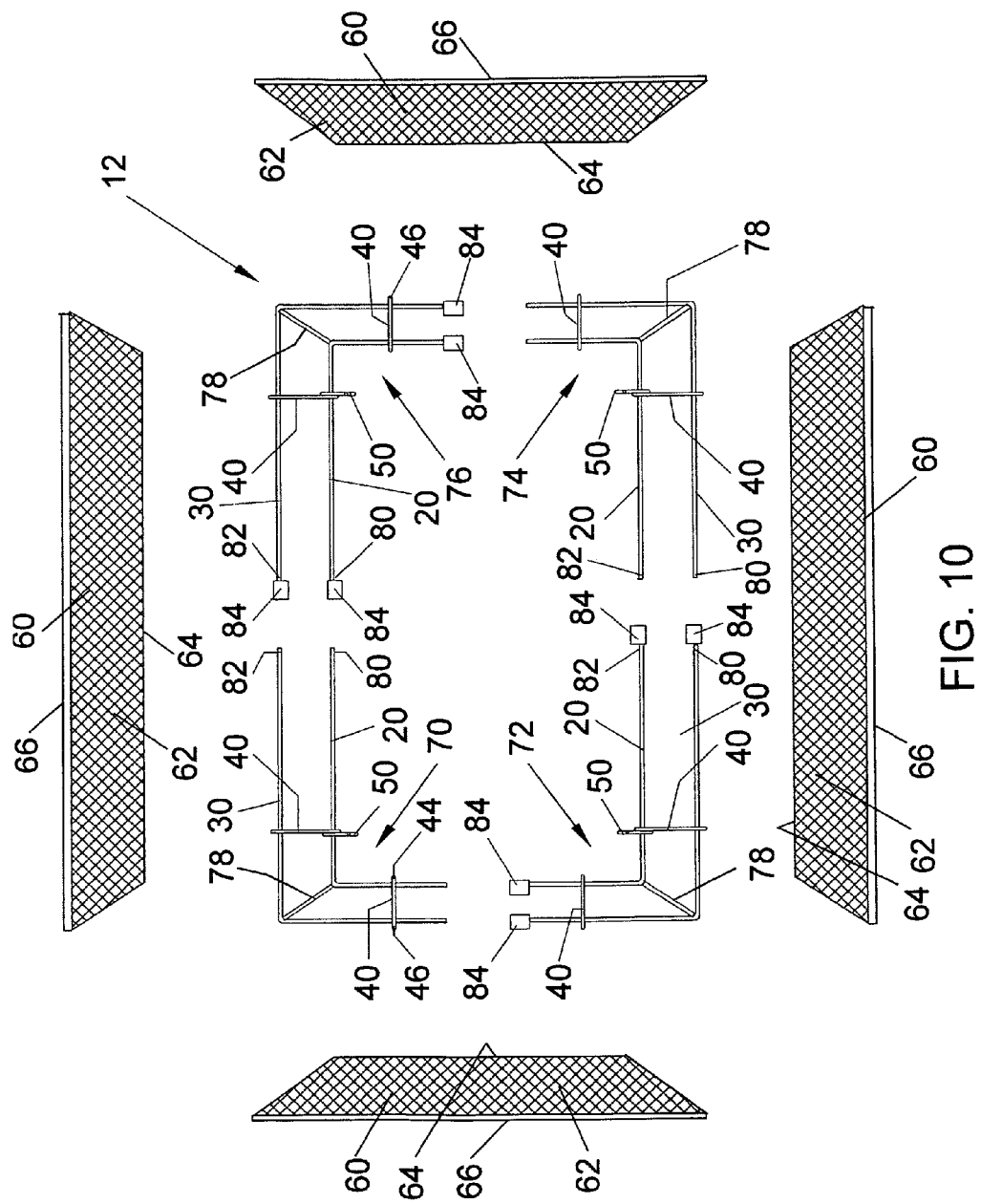
FIG. 10 illustrates an exploded bottom plan view of a light reflector frame structure and four reflective panels according to an embodiment of the invention.

The light reflector frame 12 may be constructed of four sections 70, 72, 74 and 76 as best viewed in FIG. 10. Each section has a corner transverse member 78 attached between the upper wire frame 20 section and the lower wire frame 30 section. Also, a transverse bracket 40 is attached between the upper wire frame 20 section and the lower wire frame 30 section spaced apart from and on each side of the corner transverse member 78 of each section 70, 72, 74, 76 for structural integrity of each section. The wire frame ends 80, 82 may be joined by positioning pairs of ends 80 overlapping and pairs of ends 82 overlapping to then position a spring clip 84 or clamp 86 that may be approximately oblong shape over the overlapped ends 80, 82 to frictionally or pressure fix the frame 12 structure, see FIGS. 1 through 4 and 10.

The reflective panels 60 with reflective surface 62 may be a generally trapezoid shape to conform to each element of the light reflector frame 12, see FIG. 10. The panels 60 may be different length and width depending on the angle A of a particular side of the frame 12 relative to the centerline 108 of the lamp 100. This may depend on the type of lamp 100 and number of plants 120 for which the light reflector structure 10 is being used. One example of this type of variable size and shape is for the lamp 100 illustrated in FIGS. 1 and 2. The elongated light bulb 110 with socket end 112 will emit more light at the bulb end 110 than the socket end 112; therefore, the first end 90 may be slanted at an angle A of 12 degrees for light reflection and the second end 92 of the structure 10 may be slanted at an angle A of 32 degrees for light reflection. The two sides 94, 96 may be slanted with the same angle A of 25 degrees.

The angle A of the reflective panels relative to the light bulb 110 light source may be a further function of whether the lamp enclosure 102 has an inner surface of reflective material and the angular orientation of the cover 104 panel structure. For the illustrated lamp 100 the reflective panels 60 should be oriented at angles A that are smaller relative to the lamp centerline 108 than the cover 104 panels in order to receive significant incident light. Also, the lamp 100 may or may not have a transparent panel 114 across the bottom of the enclosure 102. With plants 120 placed with their tops adjacent the transparent panel 114 of the lamp 100 it was found by experiment that vertical reflective panels 60, that is, angle A at zero degrees, were significantly less effective.

While the frame 12 elements have been described as wire, the wire is a rigid material such as metal, steel, chrome coated metal, and may be rods, bars that are cylindrical, square or rectangular, and the like.

The reflective panels 60 should be constructed of light weight material to avoid significant weight increase on overhead lamp 100 structure both for existing lamp retrofit applications and new lamp site structures. A panel structure of light corrugated sheeting that is formed from a plastic or polypropylene copolymer material may be suitable. A scored or irregular reflective coating may be applied or formed on one side of a two sided panel. One example is a corrugated sheeting product of Coroplast®. Light weight structure facilitates repositioning the light source above plants as they grow. The reflective material may be bounded or coated to the surface of the panels 60. A diamond silver white Mylar surface has been found to be an effective reflective material; however, other reflective material may also be used.

Figure 11:
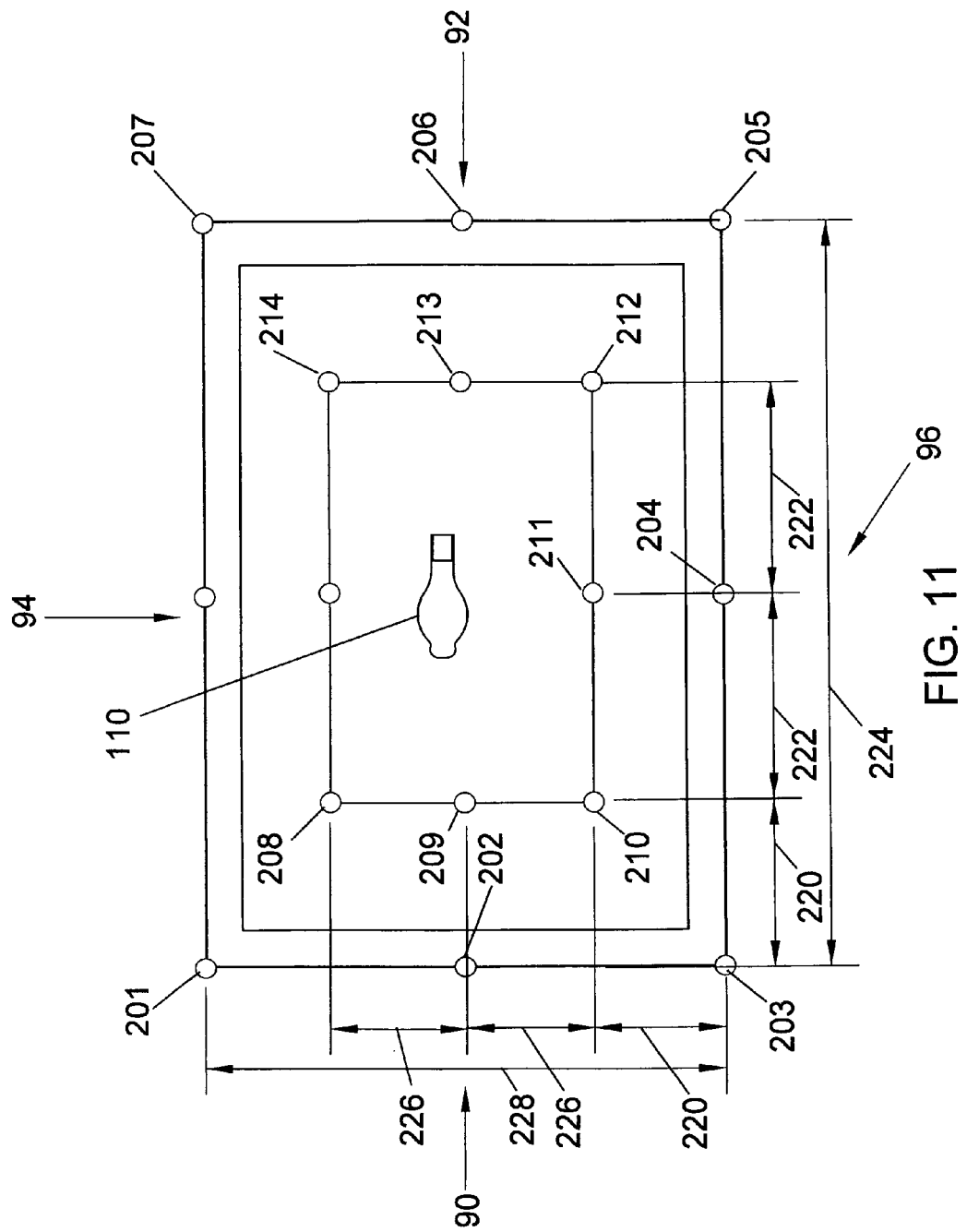
FIG. 11 illustrates in schematic form a light intensity mapping diagram according to an embodiment of the invention.

Referring to FIGS. 1, 2, 11 and 12, experimental testing of a lamp 100 with an enclosure 102 with a bottom glass panel 114 with a peripheral dimension of 29½ inches by 37¾ inches was performed by obtaining light readings in luxes at reference points 201 through 214 indicated on FIG. 11. The reference points 201 through 207 were located outside the bottom peripheral edge of the light reflector structure 10 and the reference points 208 through 214 were located at the peripheral edge 106 of the lamp 100. The spacing of the reference points identified on FIG. 11 as 220 is 10 inches, 222 is 18⅞ inches, 224 is 59¾ inches, 226 is 14¾ inches and 228 is 49½ inches The reflective panels 60 were oriented at the first end 90 at 12 degrees angle A, second end 92 at 32 degrees angle A, and at each side 94, 96 at 25 degrees angle A. The panels were approximately 12 inches wide from the top edge 64 to the bottom edge 66. The light bulb 110 was positioned at the center, above the rectangular glass panel 114 and was a 1000 watt bulb. An average of over 25 percent increase in luxes was experienced with the light reflector structure 10 installed. There were no lux measurements for comparison within one foot of the lamp 100 glass panel 114 since the reference points 201 through 207 were outside the periphery of the light reflector structure 10. Tests were also conducted with reflective panels 60 wider than 12 inches; however, because the light intensity from a light source decreases rapidly based on the square root of distance there was not significant improvement.

While the invention has been particularly shown and described with respect to the illustrated embodiments thereof, it will be understood by those skilled in the art that the foregoing and other changes in form and details may be made therein without departing from the spirit and scope of the invention.

I claim:

1. A light reflector structure for horticultural lamps comprising:
   a light reflector frame has an upper wire frame and a lower wire frame each of generally rectangular form that are spaced apart and attached at an upper peripheral edge and a lower peripheral edge by a plurality of transverse brackets;
   at least four of said plurality of transverse brackets have a hook formed at a top end and a bottom end wherein each of said hooks open inwardly of said upper wire frame and said lower wire frame;
   at least one reflective panel is disposed inwardly of said at least four transverse brackets engaging said hooks with a reflective surface of each reflective panel oriented inwardly of said at least four transverse brackets; and
   at least two pairs of opposed transverse brackets of said plurality of transverse brackets have an extended member at said top end disposed to extend upwardly over a cover of a horticultural lamp enclosure.

2. The light reflector structure as in claim 1 wherein there is disposed on said light reflector frame a first reflective panel on a first end, and second reflective panel on a second end, a third reflective panel on a first side, and a fourth reflective panel on a second side.

3. The light reflector structure as in claim 1 wherein said upper wire frame and said lower wire frame are attached by a corner transverse member at spaced apart adjacent corners.

4. The light reflector structure as in claim 1 wherein said at least one reflective panel is a trapezoid shape with a width of approximately one foot and a length of one of a first end, a second end, a first side, and a second side of said light reflector frame.

5. The light reflector structure as in claim 1 wherein said upper wire frame is sized to be the approximate shape of said cover peripheral edge.

6. The light reflector structure as in claim 1 wherein said light reflector frame is shaped such that said at least one reflective panel when disposed inwardly is positioned at an angle A relative to a vertical centerline of said cover of between 0 degrees and 90 degrees.

7. The light reflector structure as in claim 2 wherein said first reflective panel is positioned at a first angle A relative to a vertical center line of approximately 12 degrees, said second reflective panel is positioned at a second angle A of approximately 32 degrees, said third reflective panel is positioned at a third angle A of approximately 25 degrees, and said fourth reflective panel is positioned at a fourth angle A of approximately 25 degrees.

8. The light reflector structure as in claim 1 wherein:
   each of said hooks at each of said top ends of each of said plurality of transverse brackets are curved outwardly at a hook end to be spaced apart from said transverse brackets; and
   each of said hooks at said top ends and each of said hooks at said bottom end are spaced apart to allow a top edge of one of said reflective panels to be first inserted in said hooks at said top ends and then to be lowered for insertion in said hooks at said bottom edge.

9. The light reflector structure as in claim 8 wherein each of said hooks at said bottom ends are curved outwardly at a hook end to be spaced apart from said transverse brackets.

10. The light reflector structure as in claim 1 wherein said light reflector frame is formed as four sections wherein:
    each section has a corner transverse member attached between said upper wire frame and said lower wire frame;
    each end and each side of said light reflector frame is separated at their approximate midpoint to form a plurality of upper frame ends and a plurality of lower frame ends;
    there is at least one of said transverse brackets attached intermediate each of said corner transverse members and each of said upper frame ends and said lower frame ends of each of said sections; and
    opposed said upper frame ends and opposed said lower frame ends are attached by a fastener.

11. The light reflector structure as in claim 10 wherein said fastener is a spring clip.

12. The light reflector structure as in claim 10 wherein said fastener is a generally oblong tubular clamp with a threaded screw.

13. The light reflector structure as in claim 1 wherein each of said extended members have curved ends oriented upwardly relative to said cover.

14. The light reflector structure as in claim 1 wherein each of said reflective panels is formed of a light weight fire resistant material with a reflective surface formed on one side.

15. The light reflector structure as in claim 14 wherein said light weight fire resistant material is a plastic corrugated sheeting material.

16. The light reflector structure as in claim 15 wherein said plastic corrugated sheeting material is a polypropylene copolymer material.

17. The light reflector structure as in claim 14 wherein said reflective surface is a coated diamond silver white Mylar material.

18. A light reflector structure for horticultural lamps comprising:
    a light reflector frame has an upper wire frame and a lower wire frame each of generally rectangular form that are spaced apart and attached at an upper peripheral edge and a lower peripheral edge by a plurality of transverse brackets;
    at least four of said plurality of transverse brackets have a hook formed at a top end and a bottom end wherein each of said hooks open inwardly of said upper wire frame and said lower wire frame;
    at least one reflective panel is disposed inwardly of said at least four transverse brackets engaging said hooks with a reflective surface of each reflective panel oriented inwardly of said at least four transverse brackets; and
    at least three of said plurality of transverse brackets have an extending member at said top disposed to extend upwardly over three sides of a horticultural lamp enclosure.

* * * * *